United States Patent
Gomi et al.

(10) Patent No.: US 7,240,281 B2
(45) Date of Patent: Jul. 3, 2007

(54) SYSTEM, METHOD AND PROGRAM FOR PRINTING AN ELECTRONIC DOCUMENT

(75) Inventors: Motonaga Gomi, Nagoya (JP); Tsukasa Kobayashi, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 10/685,493

(22) Filed: Oct. 16, 2003

(65) Prior Publication Data
US 2004/0128280 A1 Jul. 1, 2004

(30) Foreign Application Priority Data
Oct. 18, 2002 (JP) .............................. 2002-305028

(51) Int. Cl.
*G06F 17/24* (2006.01)
(52) U.S. Cl. ....................................... 715/513
(58) Field of Classification Search ................. 715/513
See application file for complete search history.

(56) References Cited
U.S. PATENT DOCUMENTS

| 6,178,433 | B1 * | 1/2001 | Nakamura et al. | .......... 715/513 |
| 6,185,588 | B1 * | 2/2001 | Olson-Williams et al. | .. 715/513 |
| 6,377,956 | B1 * | 4/2002 | Hsu et al. | .................... 715/513 |
| 6,546,406 | B1 * | 4/2003 | DeRose et al. | ............. 715/513 |
| 6,728,403 | B1 * | 4/2004 | Jang et al. | ................... 382/180 |
| 6,917,436 | B2 * | 7/2005 | Bates et al. | ................. 715/517 |
| 2002/0083096 | A1 * | 6/2002 | Hsu et al. | .................... 707/513 |
| 2004/0015782 | A1 * | 1/2004 | Day et al. | .................... 715/517 |

FOREIGN PATENT DOCUMENTS

JP 11-025156 1/1999

* cited by examiner

*Primary Examiner*—Doug Hutton
(74) *Attorney, Agent, or Firm*—Staas & Halsey LLP

(57) ABSTRACT

An electronic document printing system obtains a HTML file forming an electronic document, analyzes a description of the HTML file by referring to predetermined analysis defining information, extracts cover information from the description to generate a cover file, deletes information unnecessary for printing, divides the description on item unit basis of the document structure, and generates a converted file so as to print the electronic document with cover onto sheet material based on the cover file and the converted file.

16 Claims, 25 Drawing Sheets

```html
<!DOCTYPE HTML PUBLIC "-//W3C//DTD HTML 3. 2 Final//EN">
<html>

<head>
<meta http-equiv="Content-Type" content="text/html; charset=iso-2022-jp">
<meta name="TEMPLATEBASE" content="fmvman_DT_01a_r3">
<meta name="LASTUPDATED" content="11/07/01 10:20:48">
<title>FMWORLD.NET: 1. NAME AND FUNCTION OF UNIT</title>
</head>

<body  link="#3366CC" vlink="#9999CC" text="#000000" alink="#0000CC"
bgcolor="#FFFFFF" background="images/backgrnd.jpg">
<table width="100%" border="0" cellspacing="0" cellpadding="0">
<tr>
<td>
<table border="0" align="right" cellpadding="0" cellspacing="0">
<tr>
<td><a href="index.html" target="_parent"><img src="images/top.jpg" width="61"
height="28" alt="TOP" border="0" hspace="10"></a></td>
<td><a href="h_kakubu.html"><img src="images/nvprev.jpg" width="90" height="28"
border="0" alt="PREVIOUS"></a></td>
<td><a href="h_kakubu3.html"><img src="images/nvnext.jpg" width="90" height="28"
border="0" alt="NEXT"></a></td>
<td><a href="3851slix.html"><img src="images/nvindex.jpg" width="61" height="28"
border="0" alt="INDEX"></a></td>
</tr>
</table>
</td>
</tr>
</table>

<hr>

<h2>
<a name="1177276"><font color="#003366"> 1. NAME AND FUNCTION OF
UNIT</font></a>
<hr noshade>
</h2>

<p>
<a name="1180846">NAME AND FUNCTION OF PC MAIN BODY AND UNITS ON
MOTHER BOARD
</a></p>
```

FIG.3

```html
<dl>
<dd>
<img src="images/point.jpg" border="0" alt="IMPORTANT">
</dd>
</dl>
<ul><font color="#0000CC"><ul><font color="#0000CC">
<li><a name="1180848">=VERTICAL SETTING IS USED IN THE FOLLOWING. CHANGE
THE FOLLOWING IN HORIZONTAL SETTING.</a>
</font></ul>
</font></ul>
<h3>
<a name="1177287"><font color="#003366">FRONT OF PC MAIN BODY</font></a>
<hr noshade>
</h3>

<div align="absmiddle"><img src="images/h_kakubua.jpg" height="495" width="519"
border="0" align="absmiddle" alt="IMAGE">
</div><br>

<ol type="1">
<li value="1"><a name="1180919"><b>POWER LAMP</b></a>
<dl>
<dt><a name="1180920">
LIGHT ON DURING ON-POWER OF PC MAIN BODY </a>
<dt><a name="1180921">
LIGHT ON GREEN DURING ON-OPERATION AND LIGHT ON ORANGE IN STANDBY
(POWER SAVING) MODE </a>
</dl>
<li value="2"><a name="1180922"><b>POWER BUTTON</b></a>
<dl>
<dt><a name="1180923">
PRESS BUTTON UPON SETTING ON/OFF-POWER OF PC MAIN BODY AND IN
STANDBY MODE </a>
</dl>
<li value="3"><a name="1180925"><b>DISK ACCESS LAMP</b></a>
<dl>
<dt><a name="1180926">
LIGHT ON UPON WRITING/READING DATA TO/FROM HD
```

FIG.4

```
</a>
<dt><a name="1180959">
TIP RESISTANT IN VERTICAL SETTING

</a>
</dl>
</ol>

<hr>
<table width="100%" border="0" cellspacing="0" cellpadding="0">
<tr>
<td>
<table border="0" align="right" cellpadding="0" cellspacing="0">
<tr>
<td><a href="index.html" target="_parent"><img src="images/top.jpg" width="61"
height="28" alt="TOP" border="0" hspace="10"></a></td>
<td><a href="h_kakubu.html"><img src="images/nvprev.jpg" width="90" height="28"
border="0" alt="PREVIOUS"></a></td>
<td><a href="h_kakubu3.html"><img src="images/nvnext.jpg" width="90" height="28"
border="0" alt="NEXT"></a></td>
<td><a href="3851slix.html"><img src="images/nvindex.jpg" width="61" height="28"
border="0" alt="INDEX"></a></td>
</tr>
</table>
</td>
</tr>
<tr>
<td>
<br><div align="center"><font size="1">
All Rights Reserved, Copyright(c) FUJITSU LIMITED 2001</font></div>
</td>
</tr>
</table>

</body>
</html>
```

FIG.5

```
<HTML>
<HEAD>
<meta http-equiv="Content-Type" content="text/html: charset=iso-2022-jp">
<TITLE>1 NAME AND FUNCTION OF UNIT</TITLE>
</HEAD>
<BODY>
<viewdocs><K2><BASE FILENAME=002001000000.html><SUBTITLE=1 NAME AND
FUNCTION OF UNIT</K2></viewdocs)

<h2>
<a name="1177276"><font color="#003366"> 1 NAME AND FUNCTION OF
UNIT</font></a>
<hr noshade>
</h2>

<p>
<a name="1180846">NAME AND FUNCTION OF PC MAIN BODY AND UNITS ON
MOTHER BOARD
</a></p>

<dl>
<dd>
<img src="images/point.jpg" border="0" alt="IMPORTANT">
</dd>
</dl>
<ul><font color="#0000CC"><ul><font color="#0000CC">
<li><a name="1180848">VERTICAL SETTING IS USED IN THE FOLLOWING. CHANGE
THE FOLLOWING IN HORIZONTAL SETTING.</a>
</font></ul>
</font></ul>
</BODY>
</HTML>
```

FIG.6

```
<HTML>
<HEAD>
<meta http-equiv="Content-Type" content="text/html; charset=iso-2022-jp">
<TITLE>FRONT OF PC MAIN BODY</TITLE>
</HEAD>
<BODY>
<viewdocs><K3><BASE FILENAME=002001001000.html><SUBTITLE=FRONT OF PC
MAIN BODY></K3></viewdocs>
<h3>
<a name="1177287"><font color="#003366">FRONT OF PC MAIN BODY</font></a>
<hr noshade>
</h3>

<div align="absmiddle"><img src="images/h_kakubua.jpg" height="495"
width="519" border="0" align="absmiddle" alt="IMAGE">
</div><br>

<ol type="1">
<li value="1"><a name="1180919"><b>POWER LAMP</b></a>
<dl>
<dt><a name="1180920">
LIGHT ON DURING ON-POWER OF PC MAIN BODY </a>
<dt><a name="1180921">
LIGHT ON GREEN DURING ON-OPERATION AND LIGHT ON ORANGE IN STANDBY
(POWER SAVING) MODE </a>
</dl>
<li value="2"><a name="1180922"><b>POWER BUTTON</b></a>
<dl>
<dt><a name="1180923">
PRESS BUTTON UPON SETTING ON/OFF-POWER OF PC MAIN BODY AND IN
STANDBY MODE </a>
</dl>
<li value="3"><a name="1180925"><b>DISK ACCESS LAMP</b></a>
<dl>
<dt><a name="1180926">
LIGHT ON UPON WRITING/READING DATA TO/FROM HD
```

FIG.7

```html
</a>
</dl>
<li value="13"><a name="1180927"><b>BUTTON FOR TAKING OUT FD</b></a>
<dl>
<dt><a name="1180928">
PRESS UPON TAKING OUT FD </a>
<dt><a name="1180929">
DON'T PRESS UPON LIGHT-ON OF FD ACCESS LAMP </a>
</dl>
<li value="14"><a name="1180930"><b>FDD</b></a>
<dl>
<dt><a name="1180931">
SET FD AND WRITE/READ DATA </a>
</dl>
<li value="15"><a name="1180932"><b>FD ACCESS LAMP</b></a>
<dl>
<dt><a name="1180933">
LIGHT ON UPON WRITING/READING DATA TO/FROM FD </a>
</dl>
<li value="16"><a name="1180957"><b>FOOT</b></a>
<dl>
<dt><a name="1180958">
BASE IS SET UPON USING THE PC </a>
<dt><a name="1180959">
TIP RESISTANT IN VERTICAL SETTING </a>
</dl>
</ol>

</BODY>
</HTML>
```

FIG.8

```html
<!DOCTYPE HTML PUBLIC "-//W3C//DTD HTML 3.2 Final//EN">
<html>
<head>
<meta http-equiv="Content-Type" content="text/html; charset=iso-2022-jp">
<meta name="TEMPLATEBASE" content="fmvman_DT_O1a_r3">
<meta name="LASTUPDATED" content="11/07/01 10:20:33">
<!-- All Rights Reserved, Copyright(c) FUJITSU LMITED 2001 -->
<title>FMWORLD.NET: FMV MANUAL</title>
</head>

<frameset cols="27%,*">
  <frame src="3851sltoc.html" name="toc">
  <frame src="a_oku.html" name="main">

<noframes>

<body link="#3366CC" vlink="#9999CC" text="#000000" alink="#0000CC"
bgcolor="#FFFFFF" background="images/backgrnd.jpg">

<table width="100%" border="0" cellspacing="0" cellpadding="0">
<tr>
<td>
<table border="0" align="right" cellpadding="0" cellspacing="0">
<tr>
<td><img src="images/nvdum.jpg" width="90" height="28" border="0" alt="PREVIOUS"></td>
<td><a href="a_oku.html"><img src="images/nvnext.jpg" width="90" height="28" border="0" alt="NEXT"></a></td>
<td><a href="3851slix.html"><img src="images/nvindex.jpg" width="61" height="28" border="0" alt="INDEX"></a></td>
</tr>
</table>
</td>
</tr>
</table>

<hr>

<p>
<a name="591699"><font size="+1" color="#003366"><b>CONTENT</b></font></a>
</p>
```

FIG.12

```html
<a href="a_mat.html#1175761">BEFORE READING THE BOOK</a>
<dl>
 <dl>
   <dd><font size="-1"><a href="a_mat2.html#1176722">NOTATION OF THE BOOK</a></font>
   <dd><font size="-1"><a href="a_mat3.html#1179699">RECYCLE</a></font>
 </dl>
</dl>
<table border="0">
 <tr valign="bottom">
   <td nowrap><font size="-1"><a href="h_kakubu.html#1177202">CHAPTER 1</a></font></td>
   <td> </td>
   <td><a href="h_kakubu.html#1177559">NAME OF UNIT</a></td>
 </tr>
</table>
<dl>
 <dd><font size="-1"><a href="h_kakubu2.html#1177276">1. NAME AND FUNCTION OF UNIT</a></font>
  <dl>
   <dd><font size="-1"><a href="h_kakubu2.html#1177287">FRONT OF PC MAIN BODY</a></font>
   <dd><font size="-1"><a href="h_kakubu3.html#1177289">BACK OF PC MAIN BODY</a></font>
   <dd><font size="-1"><a href="h_kakubu4.html#1177290">IN PC MAIN BODY</a></font>
   <dd><font size="-1"><a href="h_kakubu5.html#1177618">MOTHER BOARD</a></font>
  </dl>
</dl>
<table border="0">
 <tr valign="bottom">
   <td nowrap><font size="-1"><a href="h_hardware.html#1177688">CHAPTER 2</a></font></td>
   <td> </td>
   <td><a href="h_hardware.html#1178216">HARDWARE</a></td>
 </tr>
</table>
<dl>
 <dd><font size="-1"><a href="h_hardware2.html#1183578">1. MOUSE</a></font>
  <dl>
```

FIG.13

```html
    <dd><font size="-1"><a href="h_hardware2.html#1177886">HOW TO USE
MOUSE</a></font>
  </dl>
  <dd><font size="-1"><a href="h_hardware3.html#1178585">2 KEYBOARD</a></font>
  <dd><font size="-1"><a href="h_hardware4.html#1178586">3 CD</a></font>
  <dl>
    <dd><font size="-1"><a href="h_hardware4.html#1177741">CAUTION</a></font>
    <dd><font size="-1"><a href="h_hardware5.html#1177742">SET/PULL OUT
CD</a></font>
  </dl>
  <dd><font size="-1"><a href="h_hardware6.html#1177744">4 FD</a></font>
  <dl>
    <dd><font size="-1"><a href="h_hardware6.html#1177745">CAUTION</a></font>
    <dd><font size="-1"><a href="h_hardware7.html#1178657">FD</a></font>
  </dl>
  <dd><font size="-1"><a href="h_hardware8.html#1183433">5 HD</a></font>
  <dl>
     <dd><font size="-1"><a href="h_hardware8.html#1183436">NOTICE</a></font>
  </dl>
  <dd><font size="-1"><a href="h_hardware9.html#1178693">6 CARE OF HD</a></font>
  <dl>
    <dd><font size="-1"><a href="h_hardware9.html#1177749">CARE OF PC MAIN
BODY</a></font>
    <dd><font size="-1"><a href="h_hardware10.html#1178715">CARE OF
MOUSE</a></font>
    <dd><font size="-1"><a href="h_hardware11.html#1178726">CARE OF
KEYBOARD</a></font>
    <dd><font size="-1"><a href="h_hardware12.html#1178735">CARE OF CD</a></font>
    <dd><font size="-1"><a href="h_hardware13.html#1178737">7 FD</a></font>
  </dl>
</dl>

<a href="3851slix.html#401639">INDEX</a>

<hr>
<table width="100%" border="0" cellspacing="0" cellpadding="0">
<tr>
<td>
```

FIG.14

```
<td><a href="3851slix. html"><img src="images/nvindex.jpg" width="61" height="28"
border="0" alt="INDEX"></a></td>
</tr>
</table>
</td>
</tr>
</table>

<hr>

<div align="right">
  <p>
    <a name="1177202"><font size="+2" color="#003366">CHAPTER 1</font></a>
  </p>
</div>
<div align="right">
  <h1>
    <a name="1177559"><font color="#003366">NAME OF UNIT</font></a>
    <hr noshade>
  </h1>
</div>

<p>
 <a name="1177209">NAME AND FUNCTION OF UNIT</a>
</p>

<dl>
 <dl>
   <dt><font size="-1"><a href="h_kakubu2.html#1177276">1 NAME AND FUNCTION OF UNIT</a></font>
  </dl>
</dl>

<hr>
<table width="100%" border="0" cellspacing="0" cellpadding="0">
<tr>
<td>
<table border="0" align="right" cellpadding="0" cellspacing="0">
<tr>
<td><a href="index.html" target="_parent">< img src="images/top.jpg" width="61"
height="28" alt="TOP" border="0" hspace="10"></a></td>
<td><a href="a_mat3.html"><img src="images/nvprev.jpg" width="90" height="28"
```

FIG.16

| TAG |
|---|
| <h1> |
| <h2> |
| <h3> |
| <title> |
| <hr> |
| <href> |
| <src img> |
| <meta http-equiv="Content-Type" content="text/html; charset=iso-2022-jp"> |
| < STYLE TYPE="text/css">H6{page-break-before:always}</STYLE> |
| <H6> |

FIG.17

| TAG |
|---|
| <NAME>***</NAME> |
| <CODE>***</CODE> |
| <COPYRIGHT>***</COPYRIGHT> |
| <viewdocs><K*><BASE FILENAME="*"><SUBTITLE="*"></K*></viewdocs> |
| <K*></K*> |
| <BASE FILENAME="***"> |
| <SUBTITLE="***"> |

FIG.18

| MODULE |
|---|
| HTREEITEM hTreeItem |
| CString strTitle |
| int iRoot |
| int iRootCnt |
| int iDeep |
| CString strPath |
| bool bCheckOn |

FIG.19

| TAG |
|---|
| <table> |
| <img> |
| <a> |
| OTHERS |

FIG.21

| | FUNCTION |
|---|---|
| FindKeyword.cpp | OnSearch() |
| HTMLPrint.cpp | MySetTreeViewStatus() |
| | MyUnionHtmlFile() |
| HTMLPrintDoc.cpp | OnOptKai1() |
| | OnOptKai2() |
| | OnOptKai3() |
| | OnOptKai4() |
| | OnFileOpenWeb() |
| | OnFileOpenManual() |
| MainTreeView.cpp | SetTreeViewStatus() |
| | OnSelchanged() |
| | OnCheckOnAll() |
| | OnCheckOffAll() |
| | OnCheckOnUnder() |
| | OnCheckOffUnder() |
| | OnCheckOnUnderPage() |
| | OnCheckOffUnderPage() |
| | GetCheakStatus() |
| | MySetCheckStatus() |
| | MySelectItem() |
| MainWebView.cpp | SetPrintPreview() |

FIG.25

SYSTEM, METHOD AND PROGRAM FOR PRINTING AN ELECTRONIC DOCUMENT

BACKGROUND OF THE INVENTION

1. Field of the Invention

This invention relates to a technology for printing processing in which an electronic document is downloaded via a network such as the Internet and printed as a booklet or a book.

2. Description of the Related Art

To download and print an electronic document stored on a network, hardware is required to enable a continuous connection or dialup connection to the Internet. An electronic document that is stored as a main file such as a HyperText Markup Language (HTML) file may include links to other files. Accordingly, printing a page of the electronic document may require downloading the linked files after downloading the main file.

If the files forming the electronic document are temporarily stored in a local area of a computer before printing, a user needs to modify the absolute path of the links in the main file to a path relative to the location of the files in the local area. Further, printing an electronic document displayed by a Web browser directly causes some problems: Printing navigation icons such as a previous-page button icon, a next-page button icon, a top-page button icon, and navigation banner, which are necessary for browsing but not necessary in the printed material, reduces the density of information on the printed page.

In order to shorten the time required to print an electronic document described in HTML, Japanese Unexamined Patent Application Publication No. 11-25156 describes a method in which a system downloads the files forming the Web page, automatically embeds the path to the linked file (the linked page) at the point of the link anchor to the main file (the main page), and prints the new edited file. According to the method disclosed in 11-25156, the inconvenience of downloading the linked page again and correcting the description of the linked files in the original page manually may be eliminated. The conventional method may also reduce the blank space on each page to some degree. However, in 11-25156, the description of the linked page is simply inserted at the position in the original main HTML file and the processed main page is simply and continuously printed. Therefore, according to the method disclosed in 11-25156, printing or processing Web pages that do not supply a printed material having the proper style of a booklet or book may be difficult.

SUMMARY OF THE INVENTION

It is one object of the present invention to provide a system, a method and a computer program for printing such a downloaded electronic document, for example a online help file or an online manual file, premised on viewing by a Web browser onto sheet material to obtain a real printed material having the proper style of a booklet or a book.

Specifically, it is the object of the present invention to provide a system, a method and a computer program for printing a downloaded electronic document as a real printed material having a front cover printed with the title of the document, the table of contents and so on; or a header, a footer, or both of them, containing the title of a chapter printed on individual pages.

Further, it is another object of the present invention to provide a system, a method and a computer program for printing any part of a downloaded electronic document selected arbitrarily by a user as a real printed material having the proper style of a booklet or a book.

In order to accomplish the above objects, according to one aspect of the present invention, there is provided a system for printing processing an electronic document described in a markup language comprising means for storing analysis defining information for analysis which is determined based on a description rule and a template used for describing an electronic document in the markup language; means for extracting cover information displayed on a cover of the electronic document based on tag information on a tag and a directive described in the document file and for generating a cover file of the electronic document; means for analyzing the description of the document file based on the analysis defining information, means for deleting information unnecessary for printing of the document from the document file, means for analyzing a document structure of the electronic document, means for dividing the document file on item unit generating the document structure in accordance with the analyzed document structure, and means for generating a converted file; and means for printing a document with the cover based on the cover file and the converted file in accordance with a request for printing the electronic document.

According to the above-mentioned invention, the system accesses an electronic document server for managing an electronic document via a network such as the Internet, and obtains document files in a markup language (e.g., HTML) forming one electronic document. Further, the system previously stores analysis defining information for analysis which is determined based on a description rule and a template used for describing the electronic document in the markup language. Then, the system extracts cover information for displayed on a cover of the electronic document based on tag information on a tag and a directive described in the document file, and generates a cover file of the electronic document. Then, the system analyzes the description of the document file based on the analysis defining information, and deletes information unnecessary for printing of the document from the document file. Then, a system analyzes a document structure of the electronic document, divides the document file on item unit forming the document structure in accordance with the analyzed document structure, and generates a converted file. After that, the system prints a document with the cover based on the cover file and the converted file in accordance with a request for printing the electronic document.

In addition, according to the present invention, the system, upon receiving a request for printing-with-cover indicating to print the electronic document with the cover, prints the document with the cover printed such cover information like the title of document, the table of contents, a copyrights notice based on the cover file and the converted. On the other hand, on receiving a request for printing-without-cover indicating to print the electronic document without the cover from a user, the system prints the documents with the cover information to a header part, a footer part, or both the header and the footer parts.

Further, according to the present invention, the system generates contents structure information (structured-contents structure) for generating a table of contents of the electronic document and information (file-corresponding information) having a corresponding relationship between items of the table of contents and the converted file based on the analyzed document structure, and displays the table of contents in which the display or not-display of classes in the document structure is dynamically controlled, based on the content structure information and the corresponding information, receives the item selected for printing from the table of contents, and prints the document including the selected item with the cover on the basis of the converted file corresponding to the selected item in accordance with a request of the electronic document.

As mentioned above, according to the present invention, it is possible to print the downloaded electronic document as a real document having an appearance of a booklet or a book, irrespective of the connection with the Internet of the computer terminal. In particular, it is possible to print the electronic document having the front cover printed necessary items such as a title of a document, a document code, and a copyright notice.

Further, according to the present invention, it is possible to print the electronic document having necessary items such as a title of a chapter or section and a copyright notice printed in a header part, a footer part, or both of them on each page.

Furthermore, according to the present invention, it is possible to display, on a screen of a computer, a table of structured contents generated from the files forming an electronic document and to print only the items selected arbitrarily by a user while viewing the table of structured contents and some contents of the electronic document.

BRIEF DESCRIPTION OF THE DRAWINGS

FIG. 3 to FIG. 5 are diagrams showing parts of source of an HTML file of a body text page as shown in FIG. 2;

FIG. 6 to FIG. 8 are diagrams showing a source of a converted file;

FIG. 12 to FIG. 14 are diagrams showing parts of a source of the downloaded file "index.html" so as to describe the file obtaining processing;

FIG. 16 is a diagram showing a part of a source of the HTML file so as to describe the downloading operation in data analyzing and converting processing;

FIG. 17 is a diagram showing examples of tags as an analyzed target;

FIG. 18 is a diagram showing examples of tags added in the conversion;

FIG. 19 is a diagram showing examples of items (modules) forming a table of structured contents structure;

FIG. 21 is a diagram showing examples of display icons;

FIG. 25 is a diagram showing examples of functions (modules) used for a computer program realizing the electronic document printing system.

DESCRIPTION OF THE PREFERRED EMBODIMENTS

Figure 1:
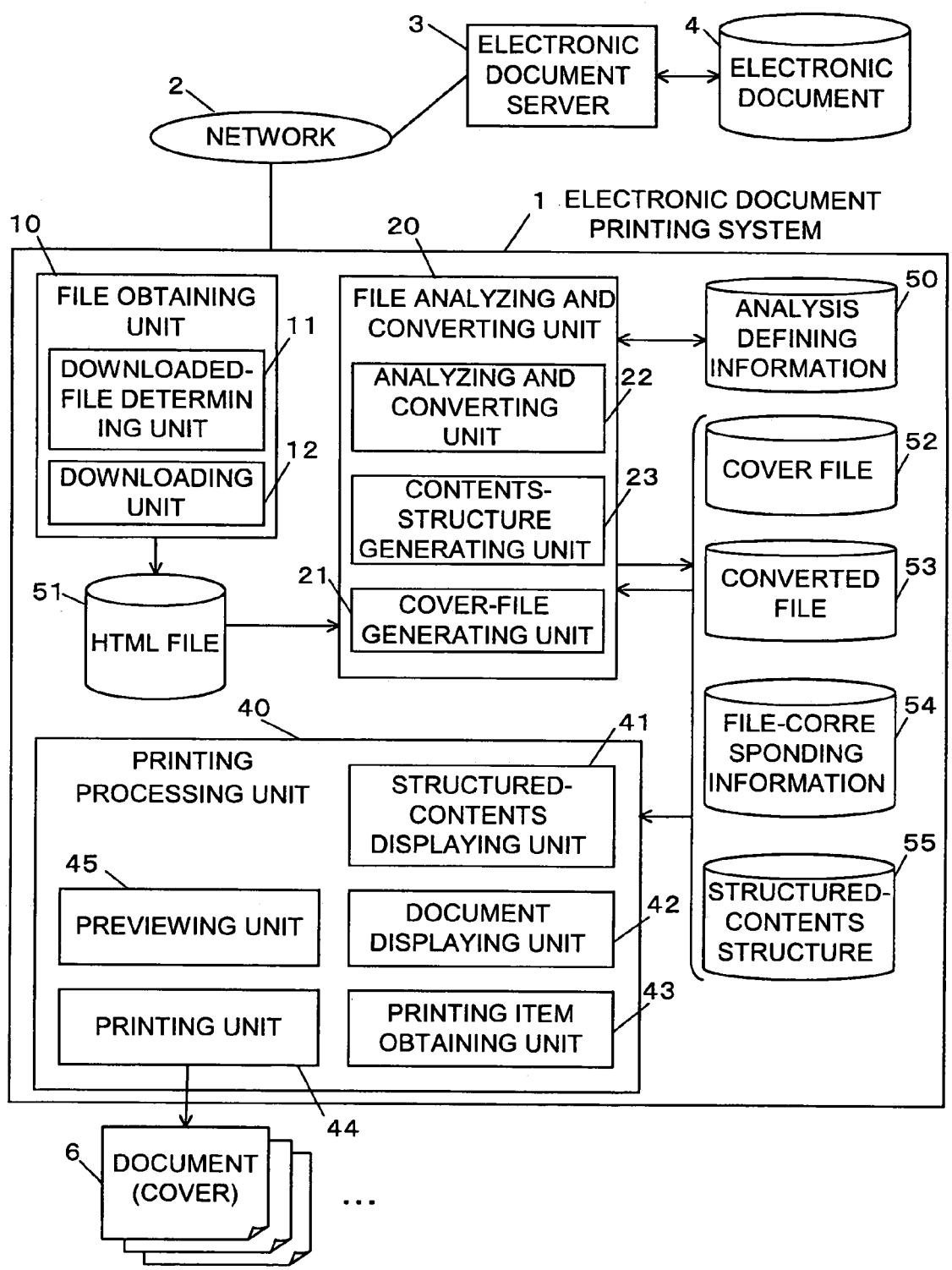
FIG. 1 is a block diagram showing an example of a configuration of an electronic document printing system according to the present invention.

FIG. 1 is a diagram showing an example of an electronic document printing system according to the present invention. An electronic document printing system 1 connects to an electronic document server 3 via a network 2. The electronic document server 3 manages an electronic document 4 premised on being displayed by a Web browser and lets the electronic document 4 be downloaded based on a user's request. The electronic document 4 is an HTML file described in HTML. The electronic document printing system 1 has a file obtaining unit 10, a file analyzing and converting unit 20, and a printing processing unit 40.

The file obtaining unit 10 downloads the electronic document 4 via the network 2 from the electronic document server 3. The file obtaining unit 10 has a downloaded-file determining unit 11 and a downloading unit 12. The downloaded-file determining unit 11 determines a plurality of files forming one electronic document 4 to be a target for printing based on a URL (Uniform Resource Locator) assigned by, for example, a user. The downloading unit 12 downloads the files determined to be a target for downloading by the downloaded-file determining unit 11 from the URL of the files forming the electronic document 4. Further, the downloading unit 12 stores the downloaded files in the electronic document printing system 1. The downloaded files of the electronic document 4 are assumed to be HTML files 51.

The file analyzing and converting unit 20 analyzes the description of each file of the HTML files 51 downloaded by the file obtaining unit 10 on the basis of analysis defining information 50. Then, the file analyzing and converting unit 20 converts the HTML files 51 to a converted file 53 and converts the description to a form that is suitable for printing on sheet material. Finally, the file analyzing and converting unit 20 forms a cover file 52 based on the HTML files 51. The file analyzing and converting unit 20 has a cover-file generating unit 21, an analyzing and converting unit 22, and a contents-structure generating unit 23.

The analysis defining information 50 includes information for the analysis of tags as targets in the analyzing processing, as well as the determination rule used in the analyzing processing. The analysis defining information 50 also includes information about tags that were added during the converting processing. The information about tags that were added during the converting processing is determined based on the template or the description rule, which was used to describe the electronic document 4 in HTML. The electronic document printing system 1 stores the analysis defining information 50, which is predetermined by the structural characteristics of the HTML file that is expected to be downloaded.

The cover-file generating unit 21 generates the cover file 52 from the file for the top page of the HTML files 51 that were downloaded by the file obtaining unit 10. The front cover of a document 6 is printed based on the cover file 52 during the printing processing. The analyzing and converting unit 22 analyzes the description of each file of the HTML files 51 based on the analysis defining information 50 and converts the HTML files 51 to a form suitable for printing onto sheet material. Specifically, the analyzing and converting unit 22 analyzes the description of each file of the HTML files 51 and downloads HTML files or image files that were referenced in the body text of the document. Further, the analyzing and converting unit 22 deletes information that is not necessary for the printed document 6.

Furthermore, the analyzing and converting unit 22 analyzes the structure of the contents of the electronic document 4 based on the description of the HTML files 51. Then, the analyzing and converting unit 22 divides each file of the HTML files 51 into units like "chapter", "section" and "unit" of the document structure. Finally, the analyzing and converting unit 22 stores the converted files 53 in the electronic document printing system 1 via the analyzing and converting process.

Further, based on the result of the analyzing processing, the analyzing and converting unit 22 stores file-corresponding information 54. File-corresponding information 54 is a corresponding relationship between a hierarchical structure of the converted files 53, divided according to the structure of the electronic document 4, and the converted files 53 used for obtaining each title of items in the table of structured contents. The contents-structure generating unit 23 forms a structured-contents structure 55 that is used for managing the table of structured contents displayed by printing processing unit 40, based on the analysis result of the analyzing and converting unit 22. The structured-contents structure 55 is information on the structure of the electronic document 4, namely, a hierarchical relationship of the converted files 53.

The printing processing unit 40 prints the contents of the HTML files 51 as a real printed material having the proper style of a booklet or a book. Further, the printing processing unit 40 includes a structured-contents displaying unit 41, a document displaying unit 42, a printing item obtaining unit 43, a printing unit 44, and a previewing unit 45.

The structured-contents displaying unit 41 displays the table of structured contents indicating the hierarchical relationship with the converted files 53 in tree structure on the Web browser (not shown in FIG. 1). In the table of structured contents, each file of the converted files 53 corresponds to an item such as "chapter, section, and item" of the document structure of the electronic document 4. The structured-contents displaying unit 41 dynamically controls the display or not-display status of the item of the table of structured contents according to a user's operation, such as a click. The structured-contents displaying unit 41 can additionally display the icon set by the predetermined file category of the file of the converted files 53 corresponding to the item of the table of structured contents.

The document displaying unit 42 displays, on the Web browser, the content of the file determined as the head item of the table of structured contents or the content of the converted files 53 corresponding to the item selected of the table of structured contents. The printing item obtaining unit 43 obtains the item selected as a target of printing in the table of structured contents displayed on the Web browser. The printing unit 44 prints the item obtained by the printing item obtaining unit 43 onto sheet material having the proper style of a booklet or a book as the document 6. The previewing unit 45 displays the contents of the item of the document 6 set for printing.

The general description of processing of the electronic document printing system 1 is given below.

Figure 2:
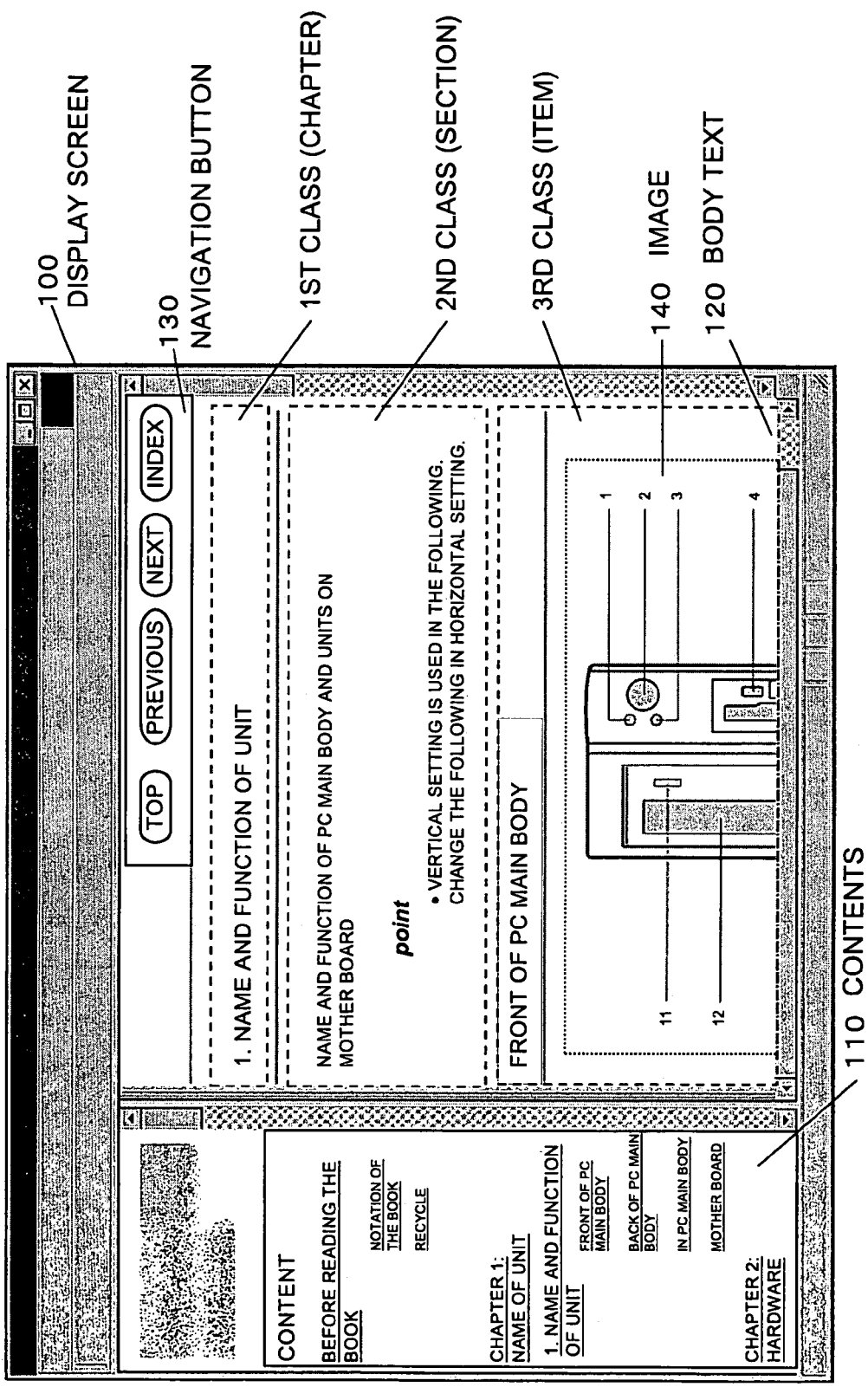
FIG. 2 is a diagram showing an example of a display screen of a page browser for displaying a page as a printing target in the electronic document.

It is assumed that the electronic document 4 downloaded by the file obtaining unit 10 in the electronic document printing system 1 is an online manual of a personal computer, such as a manual described in HTML. FIG. 2 shows an example of a display screen 100 of a Web browser for displaying one page as a target of printing in the electronic document 4. FIG. 3 to FIG. 5 show examples of parts of source of the HTML file of a body text of the page displayed on the display screen 100. The parts of source shown in FIG. 3 to FIG. 5 are of one HTML file, FIG. 3 shows a head part, FIG. 4 shows an intermediate part, and FIG. 5 shows the end part.

Generally, as shown on the display screen 100, the Web page in the electronic document 4 is displayed on the Web browser based on the description of the HTML file that was interpreted for the display, and includes a contents 110 indicating the table of contents and a body text 120 indicating the contents of the electronic document 4. The body text 120 includes a navigation button 130 as a part of the electronic document 4 and the contents of the HTML file for display. The contents of the body text 120 are combined and obtained from plural classes of the structure of the document in order to display them. As indicated by the contents 110, an item "1. Name and function of unit" in the body text 120 denotes the content belonging to the class direct below the item "Chapter 1: Name of unit" of the first class, namely, the item in the second class (section). Further, an item "personal computer main body (hereinafter, referred to as a PC main body)" and an image 140 of the PC main body in the body text 120 denotes the contents belonging to the class direct below "1. Name and function of unit", namely, the items in the third class (item).

The file analyzing and converting unit 20 analyzes and converts each file of the downloaded HTML files 51 so as not to print the Web page of the online manual as exactly shown on the display screen 100, but rather to print the page in a appropriate style for a real printed material, such as a manual). That is, the file analyzing and converting unit 20 generates a cover file 52 for printing the front cover of the document 6, and prints the electronic document 4 as a proper styled printed material. Then, the file analyzing and converting unit 20 deletes unnecessary information such as the navigation button 130 incorporated from the content in the page of the body text 120. Further, the file analyzing and converting unit 20 divides the HTML files 51 corresponding to the body text 120 into items such as "chapter, section, or item" in the document structure, based on the item units, and generates the converted files 53 from the divided items. Then, the file analyzing and converting unit 20 stores, as file-corresponding information 54, information about the hierarchical relationship between the divided and generated classes of the converted files 53 as a structured-contents structure 55. Specifically, the file analyzing and converting unit 20 determines that the description of the HTML file 51 includes "1. Name and function of unit (Chapter 1, Section 1)" as the item in the second class (section) forming "Chapter 1: Name of unit" in the first class (chapter) and "front of personal computer main body (hereinafter, referred to as front of PC main body) (Chapter 1, Section 1, Item 1)" as the under-item in the third class (item). Then, the file analyzing and converting unit 20 divides the HTML file 51 into those items based on the analyzing result, and generates two converted files 53.

FIG. 6 to FIG. 8 show the source of the converted files 53. FIG. 6 shows the source of the file of "1. Name and function of unit," which was divided from the HTML file as items of the second class (section) shown in FIG. 3 to FIG. 5. FIG. 7 and FIG. 8 show the source of the file of "front of PC main body" as the item in the third class (item) divided from the HTML file 51.

Figure 9:
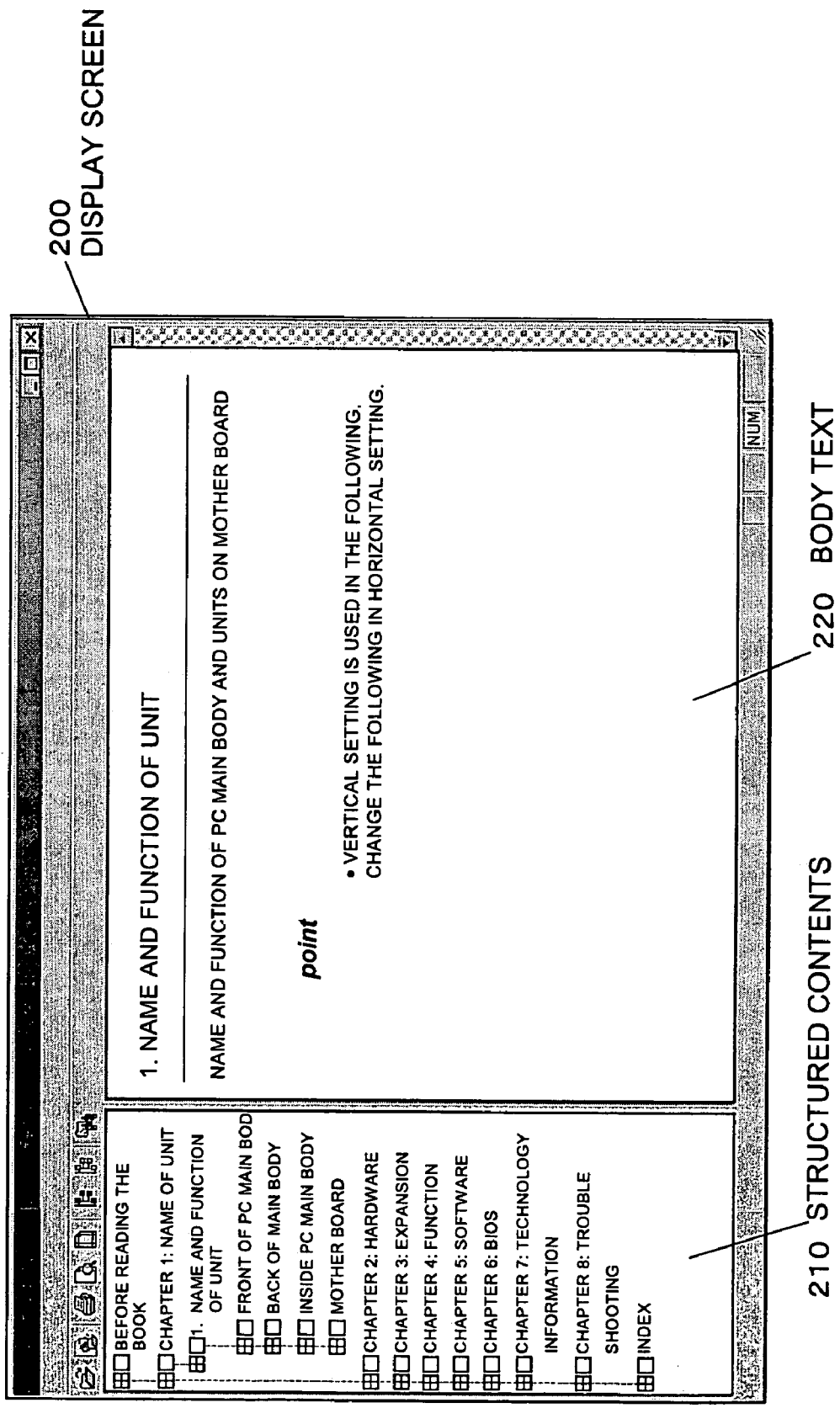
FIG. 9 is a diagram showing an example of a display screen of a table of structured contents and a page of the converted file.

FIG. 9 shows an example of the display screen 200 displaying the table of structured contents and the page based on the converted files 53 subjected to the analyzing and converting processing. On the display screen 200 are displayed a structured contents 210 indicating, in tree structure, the table of structured contents of the electronic document 4, and a body text 220 indicating the content based on the converted files 53. The structured contents 210 are obtained by deleting the information that is not necessary for printing, and by dividing it on the item unit basis. Referring to FIG. 9, one of the converted files 53 in the page displayed on the body text 220 is the file indicating "1. Name and function of unit" in the items of the second class (section). Thus, as shown the body text 120 in FIG. 2, the content "front of PC main body" in the third class (item) and the image 140 in the PC main body are not displayed simultaneously with the content "1. Name and function of unit".

Figure 10:
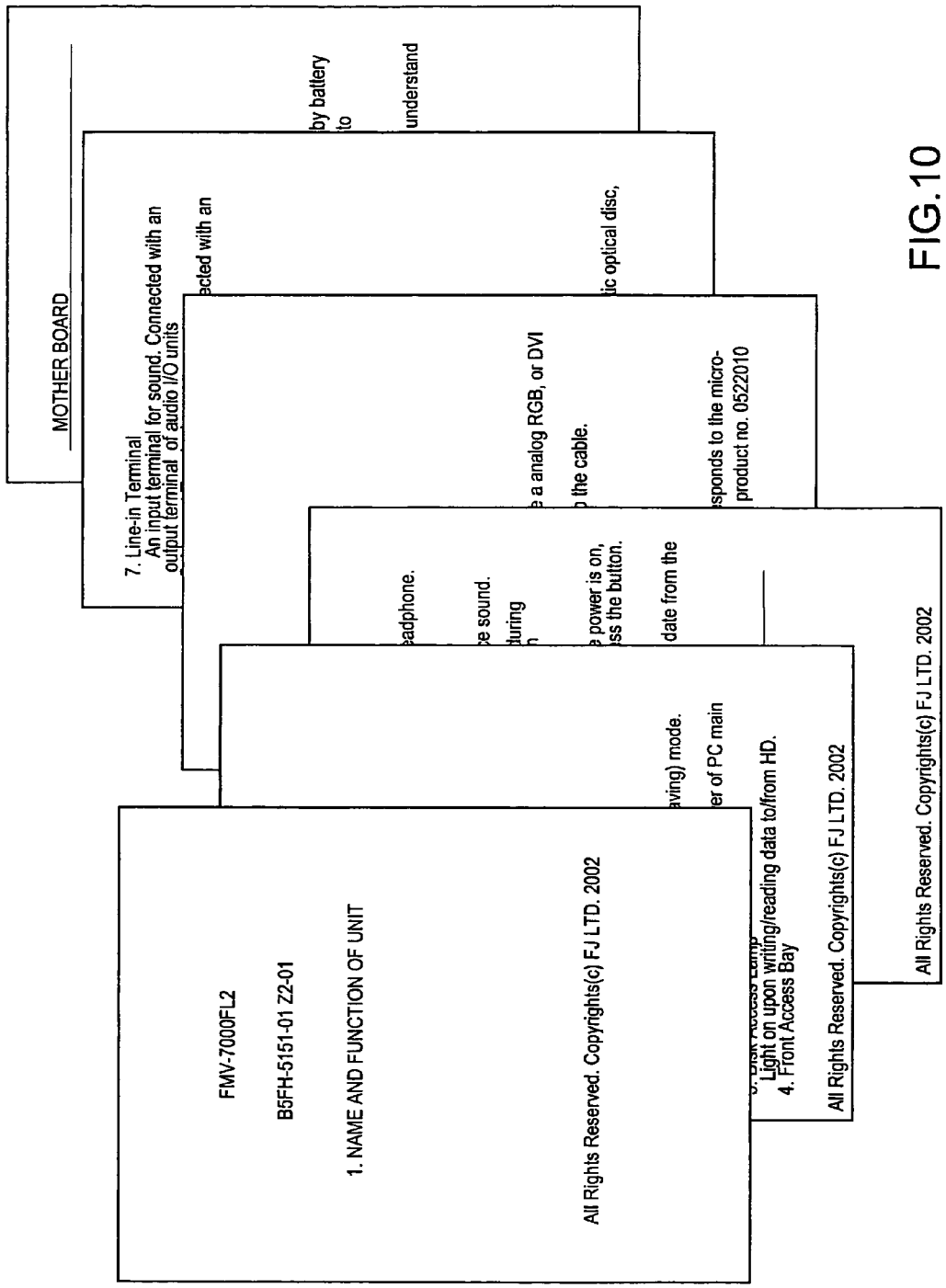
FIG. 10 is a diagram showing images of a real document as a printing result.

The user can select the items to be printed from the table of structured contents displayed on the structured contents 210 of the display screen 200. The printing processing unit 40 combines the cover file 52 and the converted files 53 corresponding to the selected items into one file for the printing job, and prints the file thereof. FIG. 10 shows the image of the printed material of the document 6 as a printing result. Thus, the electronic document printing system 1 can obtain the document 6 as the real printed material having the appearance of the booklet as shown the image in FIG. 10 from the electronic document 4 described as the HTML files 51 premised on displaying on the Web browser as shown on the display screen in FIG. 2.

Figure 11:
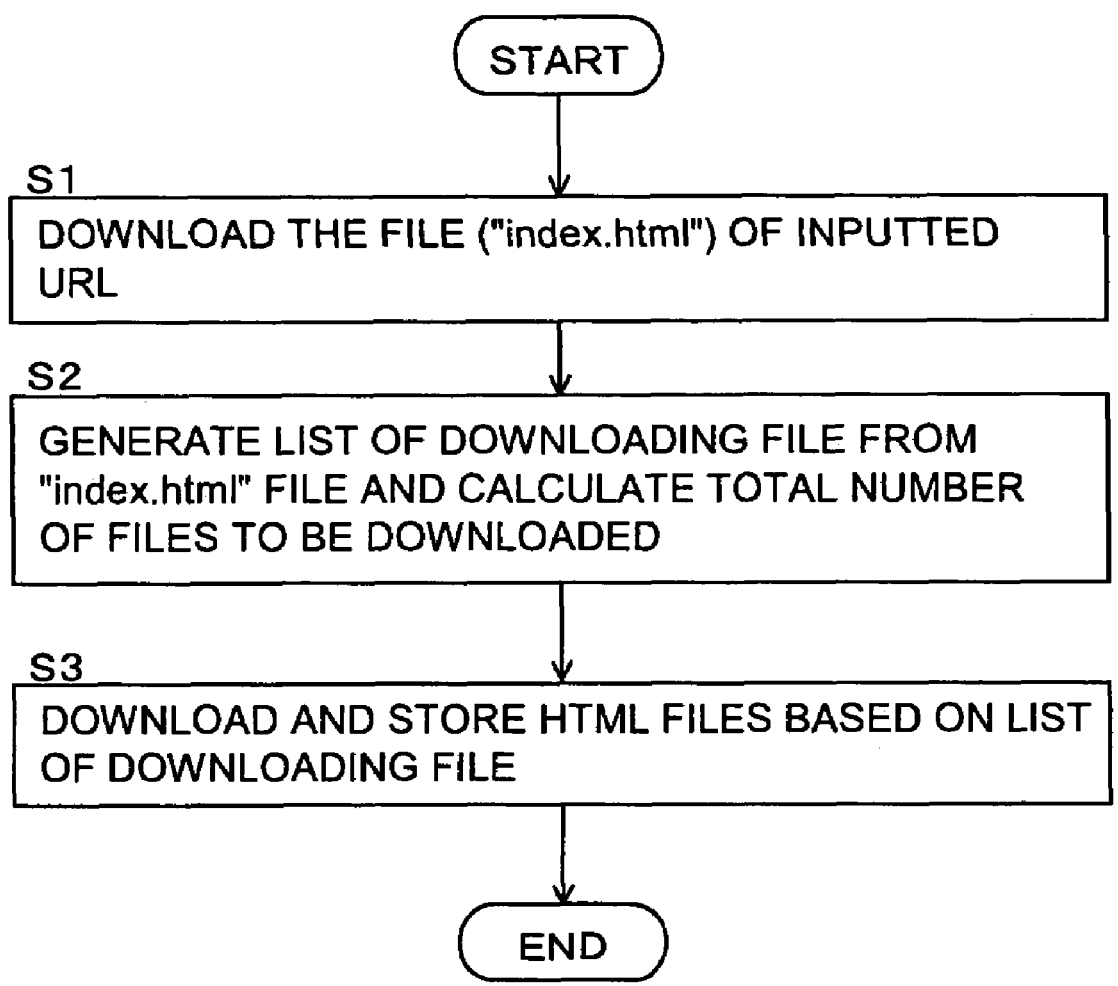
FIG. 11 is a flowchart for file obtaining processing.

Here, a detailed description of various means of processing in the electronic document printing system 1 is given. FIG. 11 shows a flowchart for obtaining the file to be processed. The downloading unit 12 accesses a URL inputted by a user or another program. The downloading unit 12 then downloads the HTML file having the description of the table of contents of the electronic document 4, for example the "index.html" file (step S1). The downloaded-file determining unit 11 generates a list of the HTML files as targets of downloading from the downloaded "index.html" file, and calculates the total number of files to be downloaded (step S2). Specifically, the downloaded-file determining unit 11 extracts the URL which is defined by <href> from a first <hr> tag to a last <hr> tag in the "index.html" file, and generates the list of the HTML files to be downloaded based on the extracted URL. When the same URL is described a plurality of times and has already been included in the URLs registered to the list, it is ignored.

FIG. 12 to FIG. 14 show parts of the source of one loaded "index.html" file. FIG. 12 to FIG. 14 show the source of a continuous portion from the head portion of the "index.html" file. The URLs defined by <href> existing from a portion shown by a downward arrow in FIG. 12 to a portion shown by an upward arrow in FIG. 14 are URLs of the HTML file as the description of the items forming the table of structured contents. The downloaded-file determining unit 11 registers the URLs to the list of the downloaded file. The downloading unit 12 downloads the HTML file constituting the electronic document 4 based on the list of the downloaded file, and stores the downloaded files as the HTML files 51 (step S3).

Figure 15:
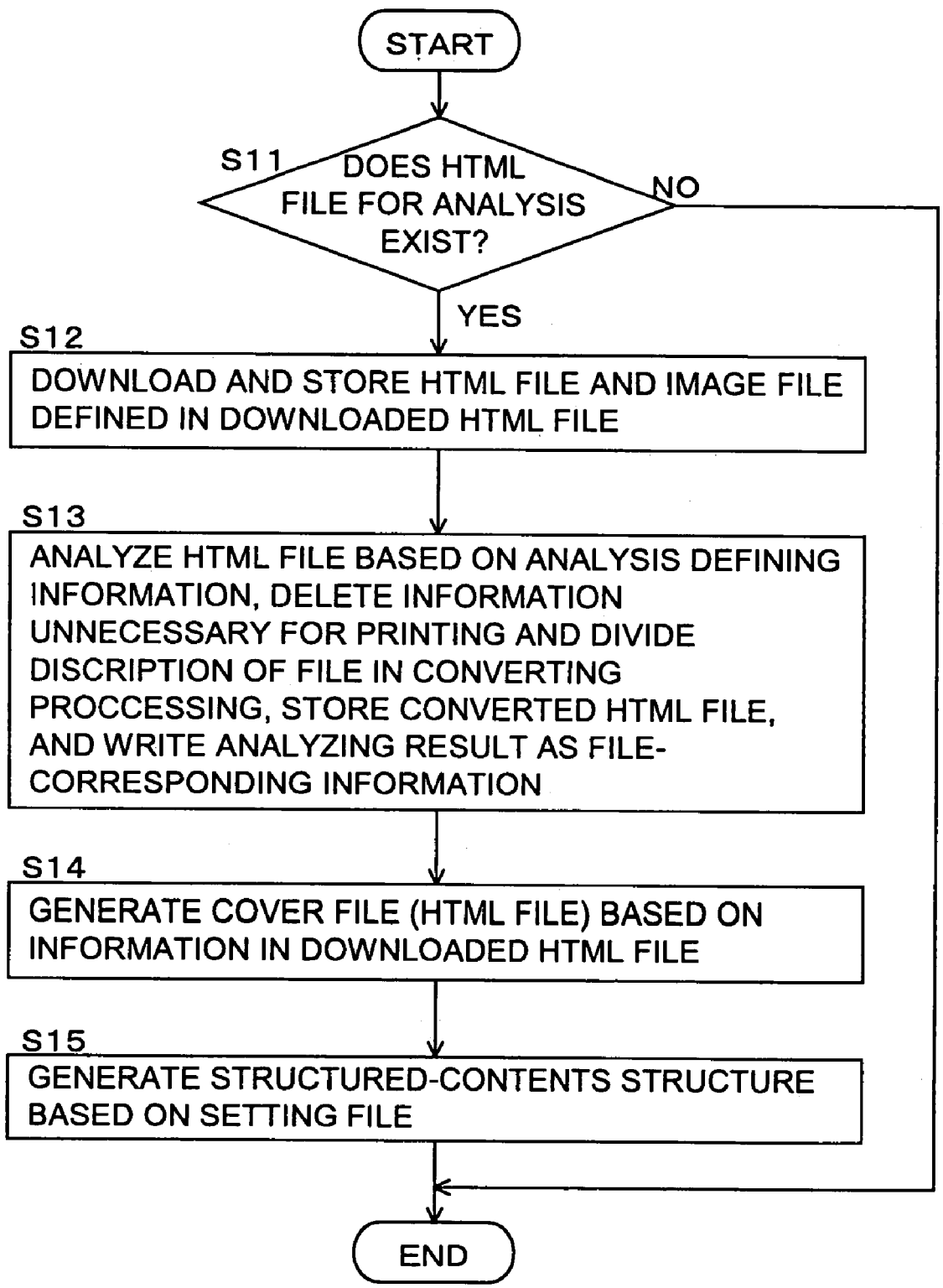
FIG. 15 is a flowchart for file analyzing and converting processing.

FIG. 15 shows a flowchart for the file analyzing and converting processing. The file analyzing and converting unit 20 obtains the URLs of the files downloaded from the file obtaining unit 10 and a path to a directory storing the HTML files 51. The analyzing and converting unit 22 determines whether or not the HTML files 51 to be analyzed exists (step S11). When the HTML files 51 to be analyzed exists, the processing sequence following step S12 is performed. The analyzing and converting unit 22 downloads the HTML file, such as an image file defined in the HTML files 51, and stores the obtained file (step S12). Specifically, the analyzing and converting unit 22 refers to all the HTML files 51 in the downloading order, downloads the HTML files 51 based on the URL defined by <href> from the first <hr> tag to the last <hr> tag in the HTML file, and further downloads the image file defined by an <img> tag. The analyzing and converting unit 22 does not download a file that was already downloaded, to avoid duplicated storing.

FIG. 16 shows a part of the source of the HTML files 51 downloaded by the file obtaining unit 10. For example, the HTML file is downloaded with the URL defined based on the <href> tag existing between a downward arrow and an upward arrow shown in FIG. 16.

The analyzing and converting unit 22 analyzes the description of the HTML files 51 based on the analysis defining information 50, deletes the unnecessary information, and divides the description of the file into each unit of "chapter, section, or item" forming the document structure as the converting processing. Then, the analyzing and converting unit 22 generates and stores the converted file and writes the result as the file-corresponding information 54 (step S13). For example, the analyzing and converting unit 22 deletes the information described before the existing position of the first <hr> tag and the information described after the existing position of the last <hr> tag in the HTML files 51 during the analysis. The analyzing and converting unit 22 also deletes the <href> tag in the HTML files 51. Further, when the HTML files 51 includes <h1>, <h2>, and <h3> tags, the analyzing and converting unit 22 generates one file using the information described before the position of these tags, and generates another file using the information described sequent thereto.

Here, a file name comprising "number string of 12 figures" and a ".html" extension are assigned to the converted files 53. The 12-figure portion in the file name is divided equally into four portions by three figures ("000111222333.html"), and the four portions are segmented into a first class, a second class, a third class, and fourth class, starting from the head. For example, the file name is as follow:

1) The name of the file of "Chapter 1" is "001000000000.html", and the file thereof belongs to the first class, 2) The name of the file of "Chapter 2" is "002000000000.html", and the file thereof belongs to the first class, 3) The name of the file of "Chapter 2, Section 1" is "002001000000.html", and the file thereof belongs to the second class, 4) The name of the file of "Chapter 2, Section 2" is "002002000000.html", and the file thereof belongs to the second class, 5) The name of the file of "Chapter 2, Section 2, Item 1" is "002002001000.html", and the file thereof belongs to the third class, and 6) The name of the file of "Chapter 3" is "003000000000.html" and the file thereof belongs to the first class.

The URLs (file names) of the HTML file are registered in the structured order to the file-corresponding information 54 so as to obtain the titles that indicate the items in the table of structured contents.

Next, the cover-file generating unit 21 generates the cover file (HTML file) 52 based on data in the downloaded HTML files 51 by the downloading unit 12 (step S14). For example, the cover-file generating unit 21 extracts the manual name, the manual code, and information on the copyright notice to be described on the front cover from the HTML files 51, such as a "top.html" file. The cover-file generating unit 21 also forms the top page in the electronic document 4, and generates and stores the cover file 52.

Specifically, the cover-file generating unit 21 generates the cover file 52 as follows:

1) The cover-file generating unit 21 determines a linefeed code and obtains a character string, on line unit basis, from the description of the target HTML file 51 such as the "top.html" file, 2) The cover-file generating unit 21 checks whether or not characters other than the HTML tag exists in the obtained character string and obtains characters other than the HTML tag, 3) If the above procedure is the first one to be performed, the cover-file generating unit 21 sets the obtained characters (character string) other than the HTML tag to be "manual name", 4) If the above procedure is the second one to be performed, the cover-file generating unit 21 sets the obtained characters (character string) other than the HTML tag to be "manual code", 5) The cover-file generating unit 21 checks whether or not the obtained character string includes characters such as "copyright", and then, in case the characters of "copyright" exists in the obtained characters, sets the obtained characters (character string) as the copyright notice, and 6) The cover-file generating unit 21 inserts the character string set as the manual name, manual code, and copyright notice into the predetermined template of the front cover sheet as the HTML file, thereby generating the cover file 52.

The analysis defining information 50 used for the analysis and conversion processing is information defining the tag as the targets of analyzing or adding in the converted files 53.

FIG. 17 shows examples of the tag as a target of analyzing defined by the analysis defining information. FIG. 18 shows examples of the tag added in the converting processing. Referring to FIG. 17, <h1>, <h2>, and <h3> tags are used for the determination upon dividing the file. The <hr> tag is used for the determination upon deleting the unnecessary information. An <href> tag is used for the determination upon downloading the HTML file. An <src img> tag is used for the determination upon downloading an image file. A <title> tag is used when the title information of the HTML file is necessary. The <title> tag is used upon obtaining a character string (title) registered to item in the table of structured contents or upon obtaining the character string of the item selected when the front cover page is formed in the printing processing or the preview processing.

An <meta http-equiv="Content-Type" content="text/html; charset=iso-2022-jp"> tag is inserted into the header portion of the converted file (HTML file) 53 which is generated through the analyzing processing. An <STYLE TYPE="text/css">H6{page-break-before:always}</STYLE> tag is inserted into the header portion of the HTML file for a printing job in the printing processing or the preview processing. In case the tag is inserted and an <H6> tag is described in the HTML file, the page-break is executed at the position of the tag described. The <H6> tag is described the position set the page-break command in the HTML file for printing job in the printing processing or the preview processing.

Referring to FIG. 18, an <NAME>*</NAME> tag is used in the header portion in the cover file 52. A character string indicating a manual name (document name) is described as a directive "*" between the tags. A <CODE>*</CODE> tag is used in the header portion in the cover file 52. A character string indicating the manual code (document code) is described as a directive "*" between the tags. A <COPYRIGHT>*</COPYRIGHT> tag is used in the header portion in the cover file 52. A character string indicating the copyright notice is described as a directive "*" between the tags. A <K*> </K*> tag indicates which class the HTML file belongs to. The tag information is used upon changing the displayed class of the item corresponding to the HTML file 51. For example, a set of <K1> </K1> tags indicates the first class and a set of <K2> </K2> tags indicates the second class.

A <BASEFILENAME="*"> tag indicates the file name of the converted files 53 after the completion of the analyzing and converting processing. The tag information is used upon changing the displayed class, an <SUBTITLE="*"> tag indicates the title of the converted files 53. The information of this tag is used upon changing the displayed class, a <viewdocs> <K*> <BASEFILENAME="*"> <SUBTITLE="*"> </K*> </viewdocs> tag is inserted into the top of the body portion in the converted files 53 generated in the analyzing and converting processing.

Further, the contents-structure generating unit 23 generates the structured-contents structure 55 based on the file-corresponding information 54 (step S15).

The structured-contents structure 55 is information for managing the configuration of the table of structured contents. FIG. 19 shows examples of modules comprising the structured-contents structure 55. The structured-contents structure 55 comprises the following modules. An "HTREEITEM hTreeItem" module is a tree handle, for managing the table of structured contents, transmitted upon registering an item to the table of structured contents. The tree handle is obtained by a return value of an "InsertItem( )" function which is used upon registering the item to the table of structured-contents. A "CString strTitle" module indicates the title displayed as an item in the table of structured contents. An "int iRoot" module indicates a flag for determining whether or not an item belongs to a root class (first class). If the value of the module equals zero (=0), the module indicates the item belongs to a child class, namely, the second or subordinated class. If the value of the module equals one (=1), the module indicates the item belongs to the root, namely, the first class. The "int iRootCnt" module indicates the registered number of the mother item to the table of structured contents. An "int iDeep" module is a flag for determining which class an item belongs to. If the value of the module equals one (=1), the module indicates the item belongs to the first class. If the value of the module equals two (=2), the module indicates the item belongs to the second class. If the value of the module equals three (=3), the module indicates the item belongs to the third class. If the value the module equals four (=4), the module indicates the item belongs to the fourth class. A "CString strPath" module indicates path information of the registered converted-file 53. A "bool bCheckOn" module is a flag for determining whether or not the item is selected on the table of structured contents. If the value of the module is TRUE, module indicates the check box of the table of structured contents is ON and the item selected. If the value of the module is FALSE, the module indicated the check box of the table of structured contents is OFF and the item not-selected.

The contents-structure generating unit 23 obtains information on class relationship between the files based on the file name having 12-figure numbers assigned to each file of converted file 53, and sets the obtained information to the structured-contents structure 55.

Figure 20:
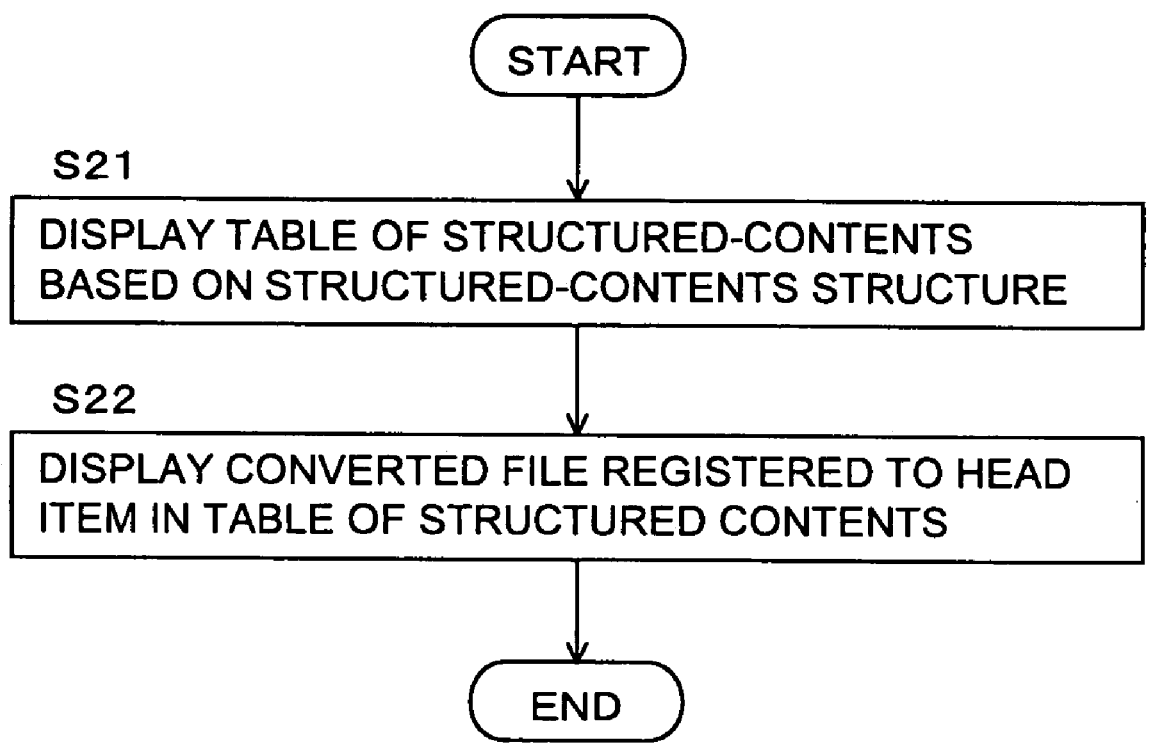
FIG. 20 is a flowchart for structured-contents display processing.

FIG. 20 shows a flowchart for the structured-contents display processing. The structured-contents display processing is executed by the structured-contents displaying unit 41 in the printing processing unit 40. The structured-contents displaying unit 41 displays the table of structured contents based on the information set to the structured-contents structure 55 (step S21). Specifically, the structured-contents displaying unit 41 extracts the item of the first class from the structured-contents structure 55, obtains the file name of the converted files 53 corresponding to the extracted item from the file-corresponding information 54. Then, the structured-contents displaying unit 41 extracts the character string (title) of the <TITLE> tag in the obtained converted-file 53, and displays, in tree structure, the title extracted on the structured contents 210 of the display screen 200. Thus, the title of each chapter as the item of the first class is displayed as a default of the table of structured contents.

The structured-contents displaying unit 41 displays the title of the table of structured contents and the icon corresponding to the type of item description. For example, the structured-contents displaying unit 41 calculates the appearance ratio of tags of the same kind from the first <hr> tag to the last <hr> tag in the converted files 53 corresponding to the item to be displayed. If a predetermined tag appears by a ratio of 90% or more, the icon representing to the tag is displayed.

Figure 21:
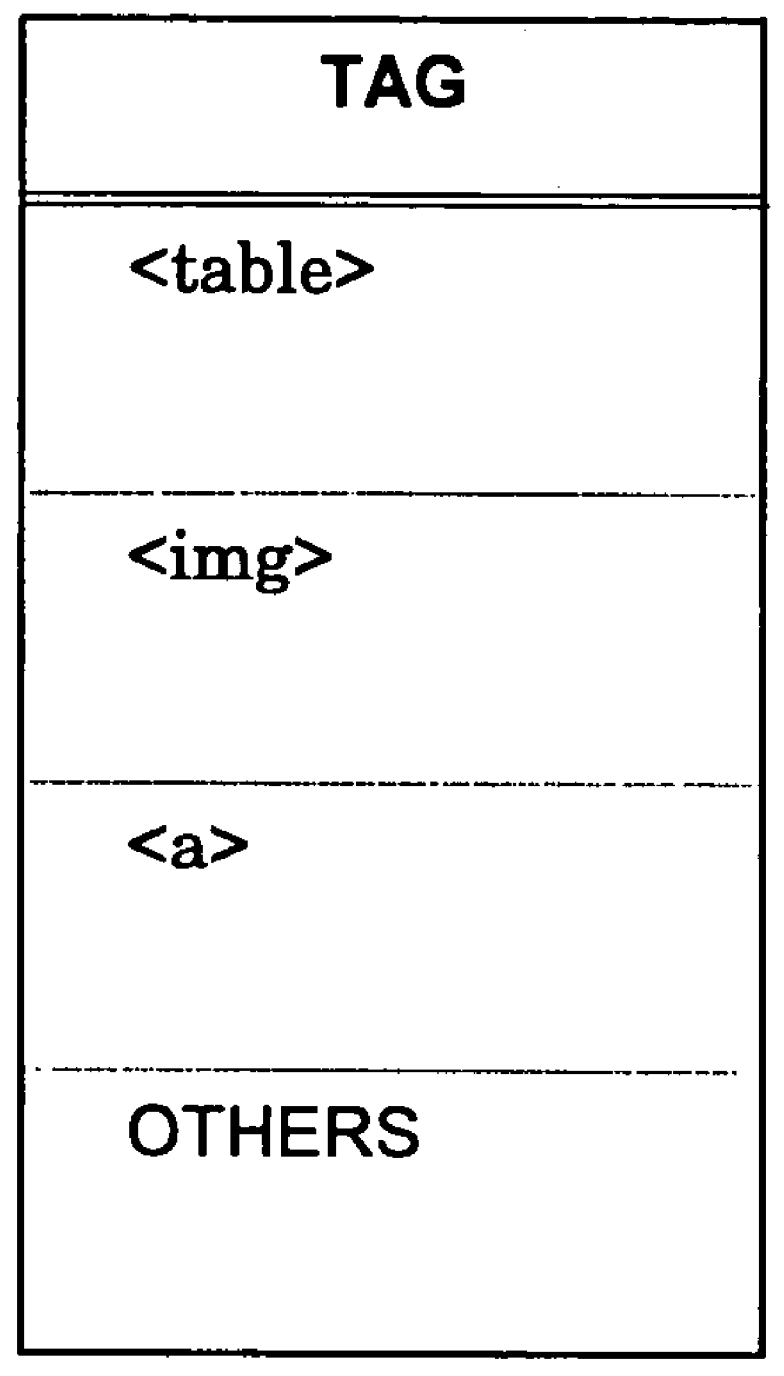

FIG. 21 shows examples of the icon. Referring to FIG. 21, if the <table> tag appears in the converted files 53 at a predetermined ratio, a table icon is displayed on the item of the table of structured contents. If the <img> tag appears in the converted files 53 at a predetermined ratio, an image icon is displayed. If the <a> tag appears in the converted files 53 at a predetermined ratio, a link icon is displayed. If the three tags do not satisfy the predetermined appearance ratio, a book icon is displayed.

The document displaying unit 42 displays, on the body text 220 on the display screen 200, the description of the converted files 53 (HTML file) registered to the head item of the table of structured contents (step S22).

Figure 22:
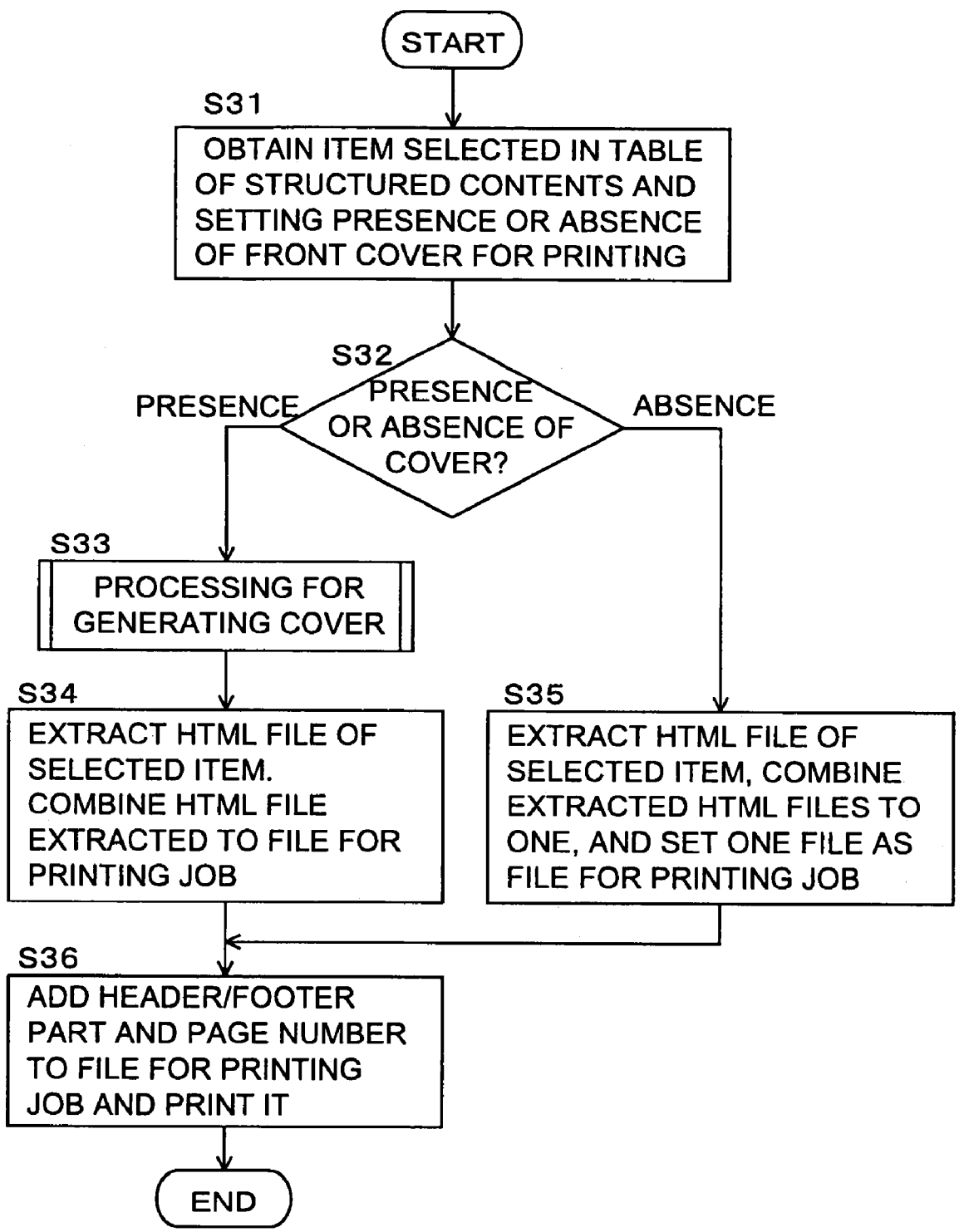
FIG. 22 is a flowchart for printing processing.

FIG. 22 shows a flowchart for the printing processing. The printing processing is executed by the printing item obtaining unit 43 and the printing unit 44 in the printing processing unit 40. The printing item obtaining unit 43 obtains the item selected from the table of structured contents and the setting of presence or absence of the cover printing (step S31). The printing item is selected by user's marking with the check box of the item displayed on the structured contents 210 of the display screen 200. The presence or absence of the cover printing is determined by selecting the menu item for the cover printing operation set in the operation designating menu portion (menu bar) or the check box set in the cover printing operation window (not shown) on the display screen 200. Then, the user selects the menu item or marks with a check on the check box to set an indication of the printing the front cover. The printing item obtaining unit 43 determines whether the front cover is present or absent (step S32). If "presence of the front cover" is determined in step S32, the cover generating processing is performed (step S33).

Figure 23:
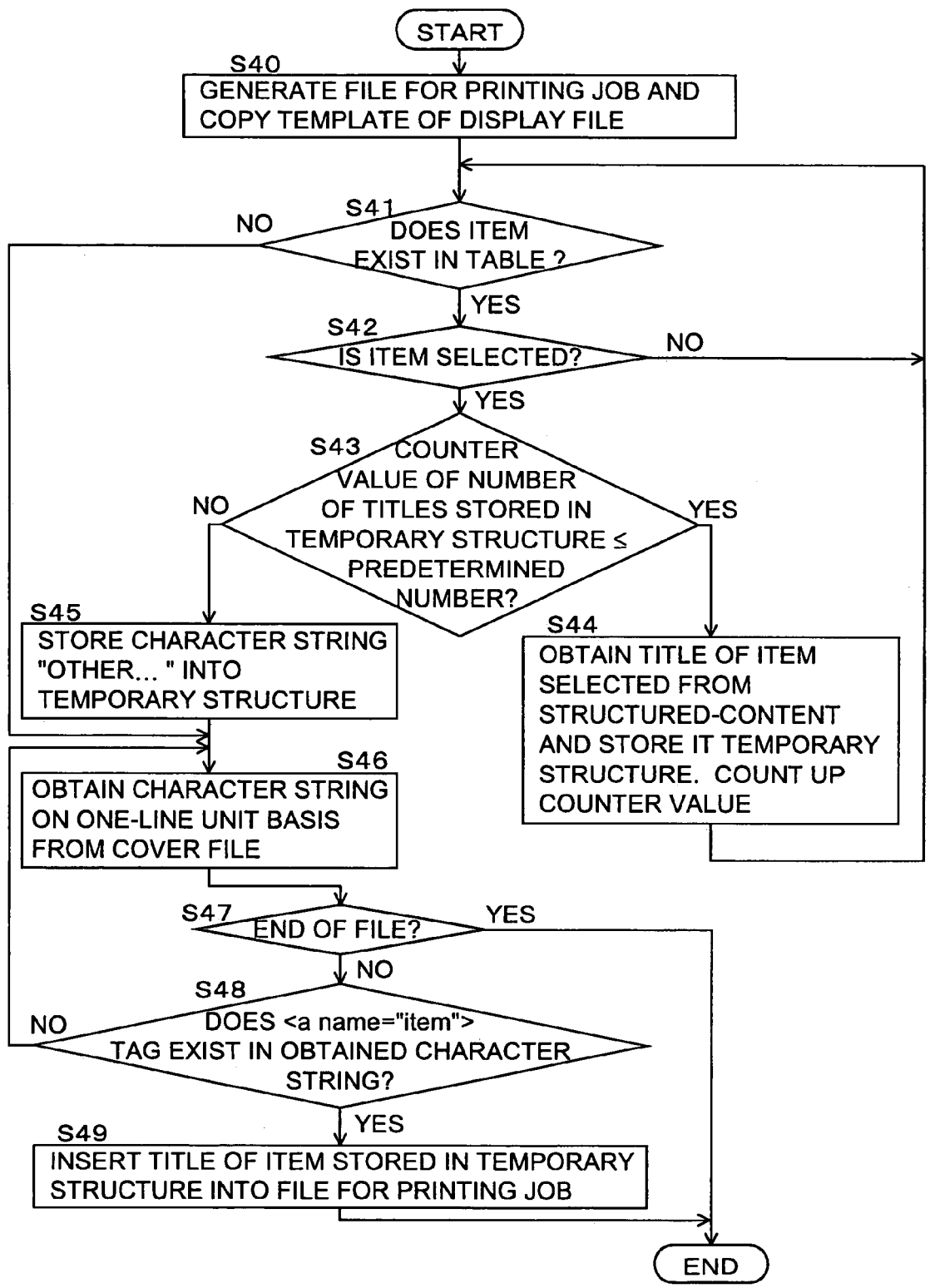
FIG. 23 is a flowchart for cover forming processing.

FIG. 23 shows a flowchart for the cover generating processing. The printing unit 44 generates the file for printing job in a work area of a memory unit, and copies the description of the template of the cover file (step S40). Further, the printing unit 44 determines whether or not the item exists in the table of structured contents based on the structured-contents structure 55 (step S41). When the item exists, the items of the table of structured contents are fetched one by one and determined whether or not the item is selected (step S42). If the item of the table of structured contents is selected by referring to the value of the "bCheckOn" flag, the printing unit 44 generates a temporary structure in the work area of the memory unit. Then, the printing unit 44 determines whether or not a counter value of the total number of titles stored in the temporary structure is not more than a predetermined number (for example the value of 15) (step S43).

When the counter value of the total of titles stored in the temporary structure is not more than the predetermined number, the printing unit 44 obtains and stores the title of the item selected on the table of structured contents into the temporary structure. After that, the counter value of the total number of titles is counted up (step S44). Specifically, the printing unit 44 obtains the file name of the converted files 53 corresponding to the extracted item from the file-corresponding information 54. Then, the printing unit 44 extracts and stores the character string (title) of the <title> tag in the obtained converted file 53 into the temporary structure, and increments the counter value of the total number of titles by one. Upon checking the class of the selected item and determining that the items belong to plural classes, the printing unit 44 stores only the title of the item of the upper class. Further, the titles of all the selected items may be stored sequentially.

If the table of structured contents includes the selected item which is not processed yet, the printing unit 44 performs the processing in steps S43 and S44 during the term the counter value of the total number of titles does not reach the predetermined number. After the counter value of the total number of titles reaches the predetermined number, the printing unit 44 stores the character string "others . . . " at the end of the titles in the temporary structure (step S45). After that, the printing unit 44 determines the character string from the cover file 52 by linefeed code and obtains it by one line unit (step S46) and determines whether or not the <a name="item"> tag exists in the obtained character string (step S48) through the end of the file (step S47). When the <a name="item"> tag exists in the obtained character string, the printing unit 44 inserts the title of the item stored in the temporary structure into the file for printing job (step S49).

When the <a name="item"> tag does not exist in the character string, the printing unit 44 obtains the character string by one-line unit (step S46), and repeats the processing in steps S48 and S49 through the end of the file (step S47).

After performing the cover generating processing (FIG. 22: step S33), the printing unit 44 extracts the converted files 53 corresponding to the selected item in the order set in the file-corresponding information 54, and combines the converted files 53 in the order for extraction to the file for printing job (step S34). It is determined whether the presence or absence of the front cover upon printing (step S32). If "the absence of a front cover" is determined, the printing unit 44 extracts the converted files 53 corresponding to the selected item in the order set in the file-corresponding information 54 and combines the converted files 53 into the file for printing job in the extracting order (step S35).

The printing unit 44 adds a header part, a footer part or both of them and the page number to each pages except the front cover of the file for printing job, and then prints the file for printing job onto sheets of paper so as to output the document 6 (step S36). For example, the printing unit 44 inserts the character strings of the title of the online manual and each title of items to the header part and the page number and the copyright notice to the footer part of the page for printing.

Figure 24:
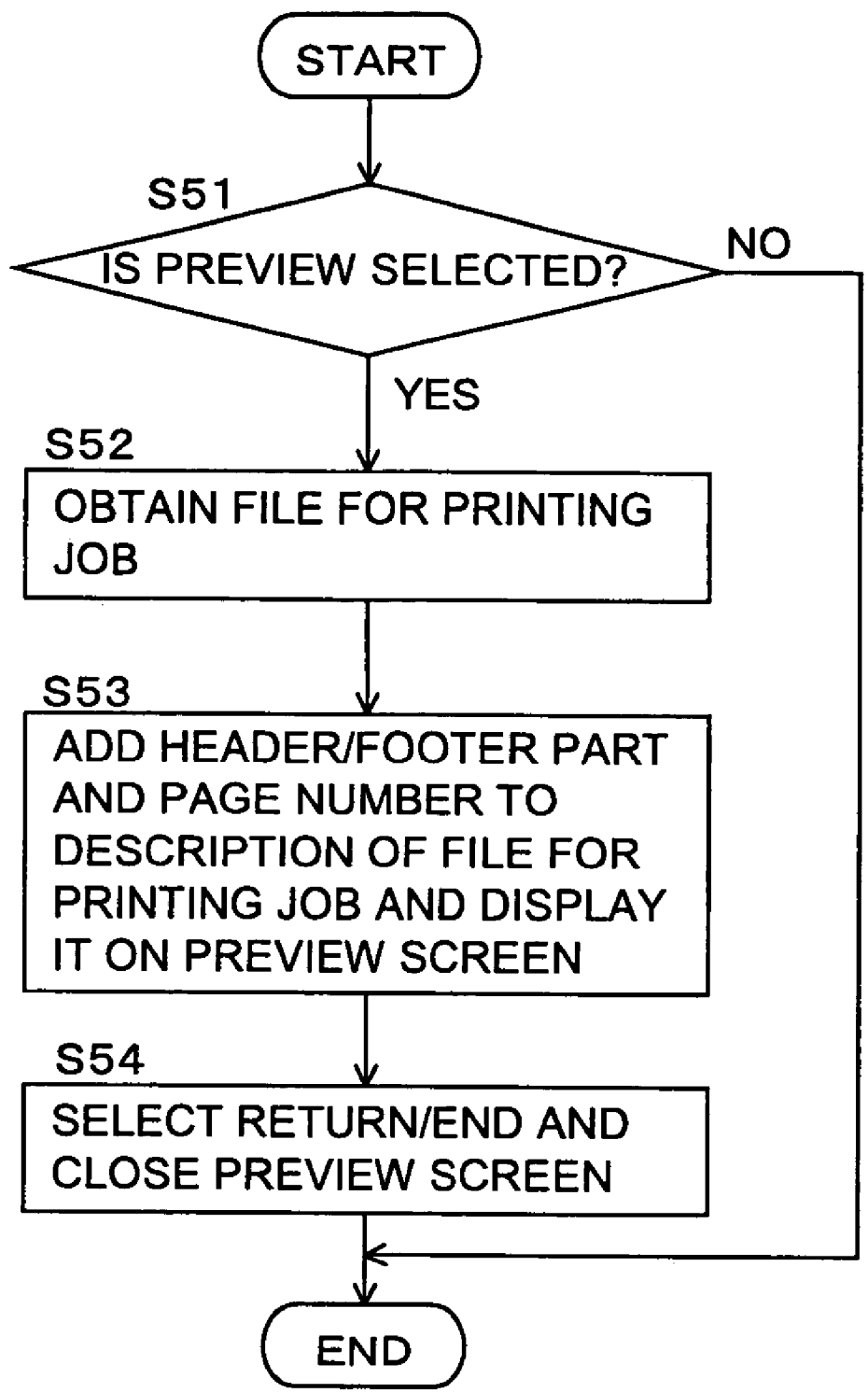
FIG. 24 is a flowchart for preview processing.

FIG. 24 shows a flowchart for the preview processing. The preview processing is executed by the previewing unit 45 in the printing processing unit 40. The previewing unit 45 determines whether or not the preview operation is selected (step S51). If the preview operation is selected, the previewing unit 45 obtains the file for printing job from the printing unit 44 (step S52). Then, the previewing unit 45 add the header part, the footer part, or both of them, and the page number to each page except the front cover of the file for printing job, and displays the contents of the file on a preview screen (not shown) (step S53). The previewing unit 45 closes and ends the preview screen when either return or end button is selected by click on the preview screen (step S54).

According to the present invention, the processing unit, functions, or components are realized as a processing program which is read and is executed by a computer. Further, the processing program according to the present invention is stored in a proper recording medium which are read by a computer, such as a movable medium memory, semiconductor memory, or hard disk. The processing program is recorded to these recording medium and is provided. Alternatively, the processing program is provided by the reception and transmission using various communication networks via a communication interface.

FIG. 25 shows examples of the functions (modules) used by the processing program when the electronic document printing system is realized by the computer-readable processing program. The description of the functions are given below:

1) "OnSearch( )" of "FindKyeword.cpp" is a function for starting a search processing, 2) "MySetTreeViewStatus( )" of "HTMLPrint.cpp" is a function for storing a value in structured contents structure 55 and "MyUnionHtmlFile( )" is a function for combining the HTML files, 3) "OnOptKai1( )" of "HTMLPrintDoc.cpp" is a function for selecting "Display up to the first class", "OnOptKai2( )" is a function for selecting "Display up to the second class", "OnOptKai3( )" is a function for selecting "Display up to the third class", "OnOptKai4( )" is a function for selecting "Display up to the fourth class", "OnFileOpenWeb( )" is a function for selecting "Open Web manual" in the file menu and "OnFileOpenManu" is a function for selecting "Open Manual" in the file menu, 4) "SetTreeViewStatus( )" of "MainTreeView.cpp" is a function for selecting an item of the table of structured contents, "OnSelchanged( )" is a function for displaying the file of the selected item, "OnCheckOnAll( )" is a function for selecting "check all items" in the pop up menu, "OnCheckOffAll( )" is a function for selecting "reset all items" in the pop up menu, "OnCheckOnUnder( )" is a function for selecting "check all items under classes" in the pop up menu, "OnCheckOffUnder( )" is a function for selecting "reset all items" in the pop up menu, "OnCheckOnUnderPage( )" is a function for selecting "check all subsequent pages" in the pop up menu, "OnCheckOffUnderPage( )" is a function for selecting "reset all subsequent pages" in the pop up menu, "GetCheckStatus( )" is a function for determining on or off of check boxes in the entire table of structure contents, "MySetCheckStatus( )" is a function for determining on or off of check box and setting a flag and "MySelectItem( )" is a function for setting designated item in the table of structured contents to selected state, and 5) "SetPrintPreview( )" of "MainWebView.cpp" is a function for executing printing or previewing processing.

According to the present invention, the user obtains an electronic document, for example a downloaded online help file or online manual file, as printed material having proper style of a booklet or a book, without regard to the status of a connection with the Internet. That is, according to the present invention, the user obtains a downloaded electronic document as printed material when the continuous access to the Internet or the dialup access is impossible. Further, the user can browse, by the Web browser, the contents of the electronic document selected as a target for printing into the printed material and confirm the contents of the file to be printed.

Furthermore, according to the present invention, the description of the files forming the electronic document are analyzed and converted to a description suitable for printing as sheet material, such as paper. Thus, as compared with simple continuous-printing of an HTML file of that is being displayed, the description of the document to be printed is compressed and the number of printed sheets is reduced.

Furthermore, according to the present invention, the user selects only those items to be printed from a table of contents indicating the items comprising the electronic document in a tree structure, and obtains a document including only the selected items as printed material in the proper form of booklet or a book.

Although the present invention is described according to certain embodiments, it can be modified without departing from the essentials of the present invention. According to the above-described embodiments of the present invention, the electronic document printing system 1 has the file obtaining unit 10 including the downloading function via the network 2. However, the file obtaining unit 10 in the electronic document printing system 1 does not have to have the downloading function. Rather, the file obtaining unit 10 can read the HTML files 51 stored in an external storage device instead, and can perform the file analyzing and converting processing and the printing processing thereof.

Further, according to the above-described embodiments of the present invention, the electronic document printing system 1 includes singular pieces of the analysis defining information. However, the electronic document printing system 1 can also have a plurality of pieces of the analysis defining information. The plurality of pieces define information previously determined by the description rule or the template used to describe the electronic document corresponding to the various electronic documents, as the target of the printing processing, in the markup language.

The entire disclosure of Japanese Patent Application No. 2003-305028 filed on Oct. 18, 2002 including specification, claims, drawings and summary are incorporated herein by reference in its entirety.

What is claimed is:

1. A system for printing an electronic document described in a markup language, comprising:
   means for determining analysis defining information based on a description rule and based on a template used for describing the electronic document in the markup language;
   means for extracting cover information displayed on a cover of the electronic document based on tag information in a tag and based on a directive described in a document file;

means for generating a cover file of the electronic document;
means for analyzing a description of the document file based on the analysis defining information;
means for deleting information unnecessary for printing the electronic document from the document file;
means for analyzing a document structure of the electronic document;
means for dividing the document file into item units;
means for generating the document structure in accordance with the analyzed document structure;
means for generating a converted file; and
means for printing a document with the cover based on the cover file and the converted file in accordance with a request for printing the electronic document.

2. A system according to claim 1, further comprising:
means for obtaining the document file in the markup language and generating the electronic document.

3. A system according to claim 1, wherein the means for extracting cover information extracts a name and identification information of the electronic document as the cover information.

4. A system according to claim 1, wherein the means for extracting cover information extracts information for a copyright notice as the cover information.

5. A system according to claim 1, wherein the means for printing a document receives a request-with-cover to print the electronic document with the cover and prints the document with a front cover based on the cover file and the converted file when receiving the request-with-cover.

6. A system according to claim 1, wherein the means for printing a document receives a request-without-cover to print the electronic document without the cover, prints the document based on the converted file by adding the cover information to a header part, a footer part, or both the header and the footer parts when receiving the request-without-cover.

7. A system according to claim 1, wherein the means for analyzing the description of the document file generates contents structure information for generating a table of contents of the electronic document and information having a corresponding relationship between items of the table of contents and the converted file based on the analyzed document structure, and
the means for printing the document displays the table of contents in which the display or not-display of classes in the document structure is dynamically controlled based on the content structure information and other corresponding information, receives an item selected for printing from the table of contents, and prints the document including the selected item with the cover on the basis of the converted file corresponding to the selected item in accordance with a request for the electronic document.

8. A computer program tangibly embodied on a computer readable medium for printing processing which causes a computer to execute processing for printing an electronic document described in a markup language, the computer program comprising instructions for:
determining analysis defining information based on a description rule and based on a template used for describing the electronic document in the markup language;
accessing the analysis defining information for analysis;
extracting cover information displayed on a cover of the electronic document based on tag information in a tag and based on a directive described in a document file;
generating a cover file of the electronic document;
analyzing a description of the document file based on the analysis defining information;
deleting information unnecessary for printing the electronic document from the document file;
analyzing a document structure of the electronic document;
dividing the document file into item units;
generating the document structure in accordance with the analyzed document structure;
generating a converted file; and
printing a document with the cover based on the cover file and the converted file in accordance with a request for printing the electronic document.

9. A computer program according to claim 8, further comprising instructions for:
obtaining the document file in the markup language and generating the electronic document.

10. A computer program according to claim 8, wherein the cover file generating comprises extracting a name and identification information of the electronic document as the cover information.

11. A computer program according to claim 8, wherein the cover file generating comprises extracting information for a copyright notice as the cover information.

12. A computer program according to claim 8, wherein the printing comprises receiving a request with-cover to print the electronic document with the cover; and
printing the document with the cover based on the cover file and the converted file when receiving the request-with-cover.

13. A computer program according to claim 8, wherein the printing comprises receiving a request without-cover to print the electronic document without the cover; and
printing the document based on the converted file by adding the cover information to a header part, a footer part, or both the header and the footer parts when receiving the request-without-cover.

14. A computer program according to claim 8, wherein the file analyzing comprises:
generating contents structure information for generating a table of contents of the electronic document and information having a corresponding relationship between items of the table of contents and the converted file based on the analyzed document structure, and
displaying the table of contents in which the display or not-display of classes in the document structure is dynamically controlled based on the content structure information and other corresponding information,
receiving an item selected for printing from the table of contents, and
printing the document including the selected item with the cover on the basis of the converted file corresponding to the selected item in accordance with a request for the electronic document.

15. A computer readable medium tangibly embodying a computer program for printing processing which causes a computer to execute processing for printing an electronic document described in a markup language, the program comprising instructions for:
obtaining a document file in the markup language forming the electronic document;
determining analysis defining information based on a description rule and based on a template used for describing the electronic document in the markup language;
accessing the analysis defining information for analysis;

extracting cover information displayed on the electronic document based on tag information described in the document file and based on a tag element for generating a cover file of the electronic document;

analyzing a description of the document file based on the analysis defining information;

deleting information unnecessary for printing the electronic document from the document file;

analyzing a document structure of the electronic document;

dividing the document file into item units;

generating the document structure in accordance with the analyzed document structure;

generating a converted file; and printing a document with the cover based on the cover file and the converted file in accordance with a request for printing the electronic document.

16. A method for printing an electronic document described in a markup language, comprising the steps of:

obtaining a document file in the markup language forming the electronic document;

defining information for analysis based on a template and based on a description rule used for describing the electronic document in the markup language;

accessing the analysis defining information for analysis;

extracting tag information described in the document file and cover information displayed on a cover of the electronic document based on a tag element;

generating a cover file of the electronic document;

analyzing a description of the document file based on the analysis defining information;

deleting information unnecessary for printing the electronic document from the document file;

analyzing a document structure of the electronic document;

dividing the document file into item units;

generating the document structure in accordance with the analyzed document structure;

generating a converted file; and printing a document with the cover based on the cover file and the converted file in accordance with a request for printing the electronic document.

* * * * *